(No Model.)
W. KOCH.
MECHANICAL MOVEMENT.
No. 458,302. Patented Aug. 25, 1891.
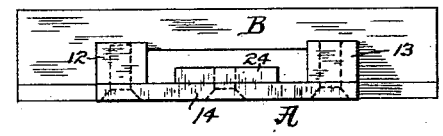
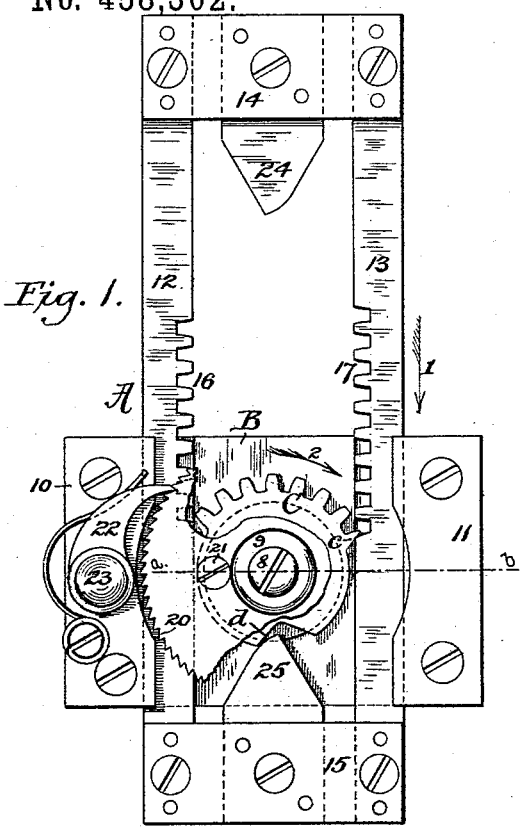
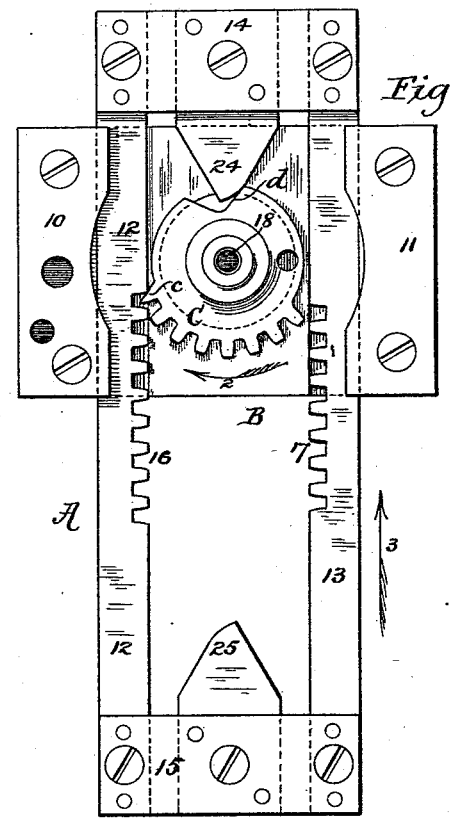
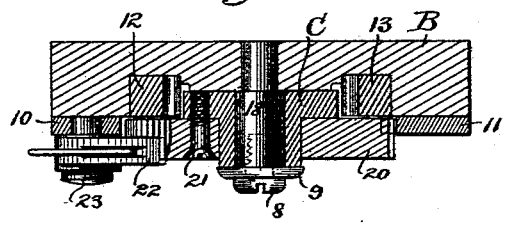
WITNESSES:
INVENTOR
William Koch
BY
ATTORNEY.

UNITED STATES PATENT OFFICE.

WILLIAM KOCH, OF NEW YORK, N. Y.

MECHANICAL MOVEMENT.

SPECIFICATION forming part of Letters Patent No. 458,302, dated August 25, 1891.

Application filed October 11, 1890. Serial No. 367,856. (No model.)

*To all whom it may concern:*

Be it known that I, WILLIAM KOCH, a citizen of the United States, residing in the city, county, and State of New York, have invented certain new and useful Improvements in Mechanical Movements, fully set forth in the following description and represented in the accompanying drawings.

This invention relates, generally, to mechanical movements, and more particularly to that class of such movements wherein the reciprocation of a part imparts a rotary motion to another part—in other words, to a mechanical movement wherein a reciprocatory movement is converted into a rotary movement, or vice versa.

The improved mechanical movement hereinafter described is particularly designed for use where it is not possible or convenient, mechanically, to impart a direct rotary movement to certain parts or instrumentalities, but which embraces a movement (such as a vibratory one) that is readily imparted to a reciprocatory part, which in turn may be converted by this invention into a rotary movement, or vice versa. To this end the improved mechanical movement embraces, essentially, two toothed rack-bars, the teeth of both racks of which project toward each other, but are separated a suitable distance apart to leave a space between their opposed faces, and are connected rigidly together to move bodily as a whole. Between the racks there is mounted a toothed segment or a mutilated pinion that is adapted to freely rotate in suitable bearings or upon a stud fixed from the frame-work. The teeth of the toothed segment mesh alternately with each rack, there being a sufficient number of teeth provided in the segment that as the last tooth leaves one rack the first tooth will be in position to engage with the teeth of the other rack. As it is impracticable for the rack that has just acted to rotate the segment to place the first tooth of the segment, so that it will mesh with the teeth of the opposite rack and at the same time in its return movement pass the last tooth of the segment, means have been devised for effecting the proper extent of rotation imparted to the segment, so that its first tooth will mesh with the next rack that is to rotate it, while its last tooth will not interfere with the reverse movement of the racks. These means in the present invention consist in mutilating the first tooth of the segment or mutilated pinion and providing the pinion with a shoulder that is struck by an abutment at each end of the reciprocating movement of the racks, which impart a very slight additional movement to the segment, so that the last tooth is wholly disengaged from one rack and the first tooth of the segment is engaged with the opposite rack.

With this general understanding of the nature of the invention, a detailed description thereof will now be given, reference being had to the accompanying drawings, in which—

Figure 1 is an elevation of one form of the invention, a ratchet-wheel, with which the toothed segment may be provided, being shown partially broken away to expose the underlying segment and showing the racks at the limit of their movement in one direction and in the act of commencing their return movement, as indicated by the arrow. Fig. 2 is a similar view, partly in section, the ratchet-wheel and pawl being omitted, with the racks at the limit of their movement in the opposite direction to that shown in Fig. 1, and in the act of commencing their reverse movement in the direction of the arrow. Fig. 3 is an end view thereof. Fig. 4 is a horizontal section taken on the line $a\ b$ of Fig. 1.

It is to be understood that while the mechanical movement is shown independent of any means for imparting the reciprocatory movement to the racks and of any means by which the rotary movement of the toothed segment may impart its movement, yet in practice there will be suitable means connected with the racks for reciprocating them bodily in opposite directions, and there will be a connection with the toothed segment to which its movement will be imparted for any desired purpose.

The improved mechanical movement consists of a reciprocatory frame A, mounted to slide back and forth in suitable guideways formed by a support or base-plate B, the said frame being held to said guideways by a pair of overlapping plates 10 11, firmly secured to the base-plate B. The reciprocatory frame is formed by two rack-bars 12 13, supported a distance apart and connected and held rigidly together by end plates 14 15, which thus form a rectangular frame having a central opening bounded by the inner faces of the two rack-bars and the two end plates. The opposed faces of the rack-bars 12 13 are each provided with a series of teeth 16 17, forming a toothed rack upon the bar 12 and a toothed rack upon the bar 13. The base-plate B also provides a support for a toothed segment or mutilated pinion C. Thus said base-plate is provided with a projecting stud 18, on which the toothed segment is mounted, so as to rotate freely thereon, and is shown as held in position on the stud by means of a washer 9 and set-screw 8. The toothed segment is mounted on the stud between the inner and opposed toothed faces of the rack-bars 12 13, and is provided with a series of teeth adapted to alternately gear with the teeth of each rack and of sufficient number to insure that each rack will impart a sufficient rotation to said segment in a complete movement of the rack-bar in one direction, as that a tooth of the segment will be brought, or is capable of being brought, into mesh with a tooth of the other rack-bar, so that it in a complete movement in the opposite direction will have correspondingly rotated the segment and have brought a tooth of the latter into mesh with the first-named rack to repeat the operation. In the position of the parts shown in Fig. 1 the reciprocatory frame A is shown as just having completed a movement in one direction, and is about to move in the opposite direction, as indicated by the arrow 1, the toothed segment being rotated in the direction of the arrow 2. As one tooth of the toothed segment will always be the first tooth to mesh with either of the racks, the tooth $c$ will be designated the "forward" or "first" tooth of the segment. In the position shown in Fig. 1 said forward tooth has just entered in mesh with the teeth of the rack-bar 13, and as the reciprocatory frame moves in the direction of the arrow the teeth of the toothed segment will mesh with the teeth 17 of the rack-bar 13, and thereby cause the segment to rotate in the direction of the arrow 2; but as the last tooth of the toothed segment is not entirely clear of the teeth 16 of the rack-bar 12 said segment would be locked upon the commencement of this movement of the reciprocatory frame, because of the simultaneous engagement of the teeth of both rack-bars with the first and last tooth of the segment, if provision were not made obviating this defective operation. In the present invention this is obviated by slightly mutilating the forward tooth $c$ of the segment and forming an inclined shoulder $d$ upon the rear side of the segment substantially diametrically opposite its toothed side, which shoulder is adapted to strike centrally-arranged abutments 24 25, mounted one at each end of the reciprocatory frame A, and which project inwardly toward one another from the respective end plates 14 15. Thus just before the frame reaches the limit of its stroke in the direction of the arrow 1 to the position shown in Fig. 2 the inclined shoulder $d$ of the toothed segment will strike against the end of the abutment 24, which will act to move the toothed segment slightly onward sufficient to remove its last tooth engaging with the teeth 17 of the rack-bar 13 and to place the forward and slightly-mutilated tooth $c$ into mesh with the teeth 16 of the rack-bar 12, as shown in said Fig. 2. With the parts in this latter position the reciprocatory frame then moves in the opposite direction indicated by the arrow 3, the toothed segment being rotated by the teeth of the rack-bar 12 until the parts again reach the position shown in Fig. 1. Immediately before they reach this position, however, the shoulder $d$ of the segment strikes the abutment 25, thereby moving said segment slightly onward and sufficient to remove its last tooth from engagement with the teeth 16 of the rack-bar 12 and to place the forward and mutilated tooth $c$ into mesh with the teeth 17 of the rack-bar 13, as shown, ready for the repetition of the operations. In addition to the function of the abutments 24 25 described they each serve in connection with the forward tooth $c$ as a positive end stop to the farther movement of the reciprocatory frame in each direction, thus obviating the necessity of providing other limiting stops.

To insure the constant rotation of the toothed segment C in one direction and to prevent any accidental slipping between the teeth of said segments and the teeth of the racks, so that it may be in danger of getting out of time with said racks, the segment is provided with a ratchet-wheel 20, (shown partially broken away in Fig. 1,) that is firmly secured thereto, so as to move in unison therewith, by a screw 21, and the teeth of the ratchet-wheel are engaged by a spring-pressed pawl 22, mounted on a stud 23, projecting from the base-plate or, as shown, from the overlapping plate 10.

What is claimed is—

1. The herein-described mechanical movement, consisting of a revoluble toothed segment and two racks adapted in their reciprocation to alternately engage said segment, the said segment having a mutilated tooth and a shoulder upon its rear side, and an abutment at the opposite ends of the pair of racks, against which the segment-shoulder alternately strikes.

2. The herein-described mechanical movement, consisting of a revoluble toothed segment and two racks adapted in their reciprocation to alternately engage said segment, the said segment having a mutilated tooth and a shoulder upon its rear side, an abutment at the opposite ends of the pair of racks, against which the segment - shoulder alternately
5 strikes, a ratchet-wheel carried by said segment, and a pawl engaging therewith.

In witness whereof I have hereunto signed my name in the presence of two subscribing witnesses.

WILLIAM KOCH.

Witnesses:
GEO. H. GRAHAM,
N. MARTER.